INVENTORS R. P. JUTSON
J. L. LAREW

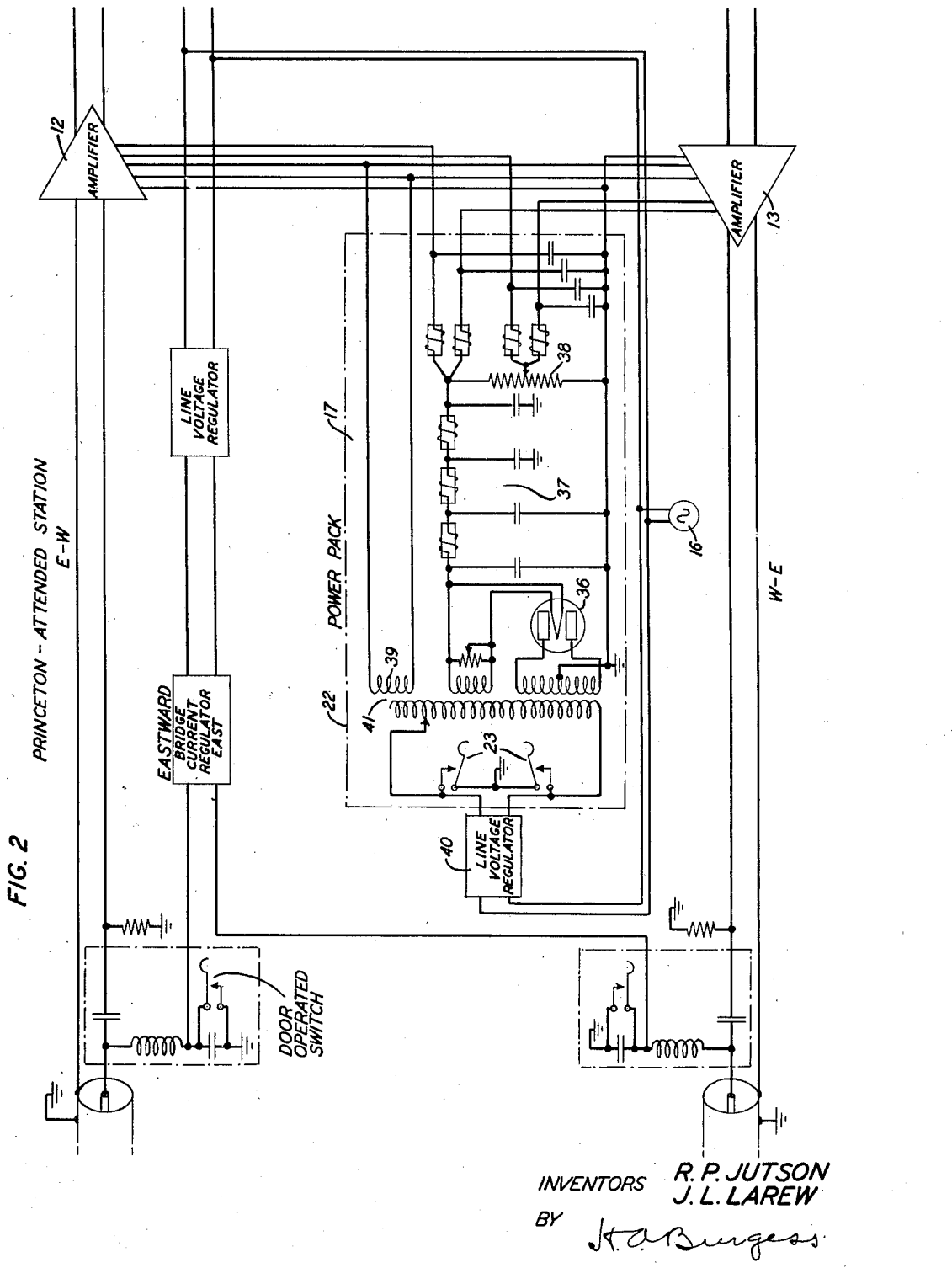

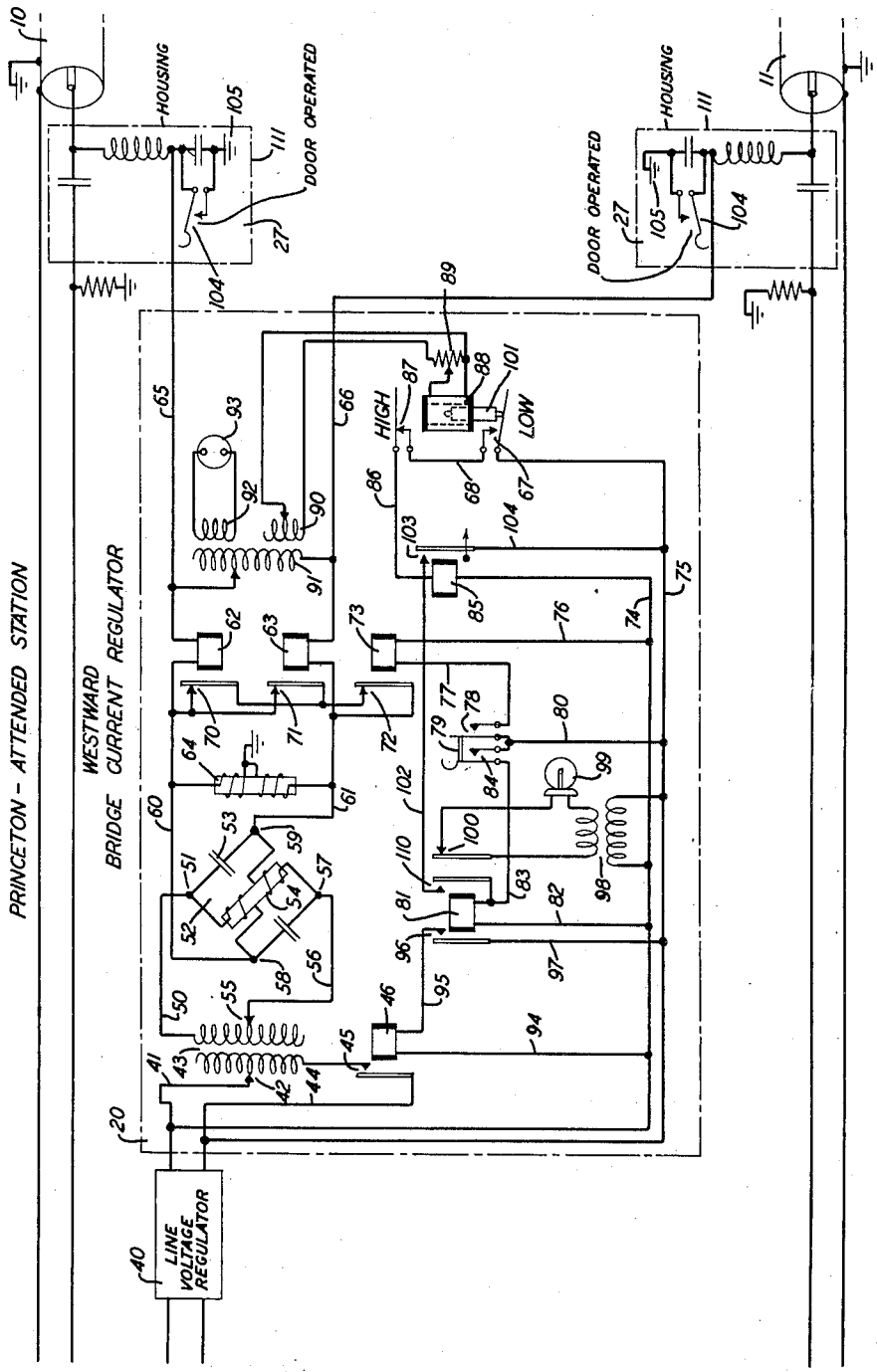

Patented Apr. 4, 1939

2,153,329

UNITED STATES PATENT OFFICE 2,153,329

CARRIER LINE POWER SUPPLY

Robert P. Jutson, Halesite, N. Y., and Joel L. Larew, South Amboy, N. J., assignors to Bell Telephone Laboratories, Incorporated, New York, N. Y., a corporation of New York Application June 26, 1937, Serial No. 150,516

9 Claims. (Cl. 179—170)

This invention relates to protective arrangements for power transmission lines and more particularly to improved safety arrangements for the clearing of faults in such lines when, for example, these comprise portions of the coaxial conductor lines employed in carrier wave signaling systems.

A carrier wave signaling system employing two coaxial conductor lines for the transmission of carrier and power currents is disclosed in the patent of M. E. Strieby No. 2,037,183 issued April 14, 1936. As mentioned in that patent it is imperative from the standpoint of efficient operation of the system to supply power currents at a certain value to the repeaters so as to maintain a proper gain for the individual repeaters. Considerable amounts of power are required in systems of this type and it is therefore desirable to provide safety equipment to protect both the apparatus and any workmen that may have occasion to test or service the system.

The present invention provides safety devices which operate to cut off the power under abnormal circuit conditions and to protect workmen from inadvertently contacting conductors carrying high voltages.

It is an object of this invention to provide safety apparatus for automatically disconnecting the power supply in response to abnormal voltage variations including those occasioned by inadvertent faults occurring on the power transmission line.

This invention will be more readily understood from the following description when taken together with the accompanying drawings in which:

Fig. 2 is a diagrammatic circuit illustrating the power pipes utilized for supplying power to the repeaters located in each station; and Fig. 3 is a diagrammatic circuit showing the bridge current regulator arrangements embodied in Fig. 1.

In the following description, corresponding conductor leads employed in each station for the same purpose are identified by the same reference characters.

Figure 1:
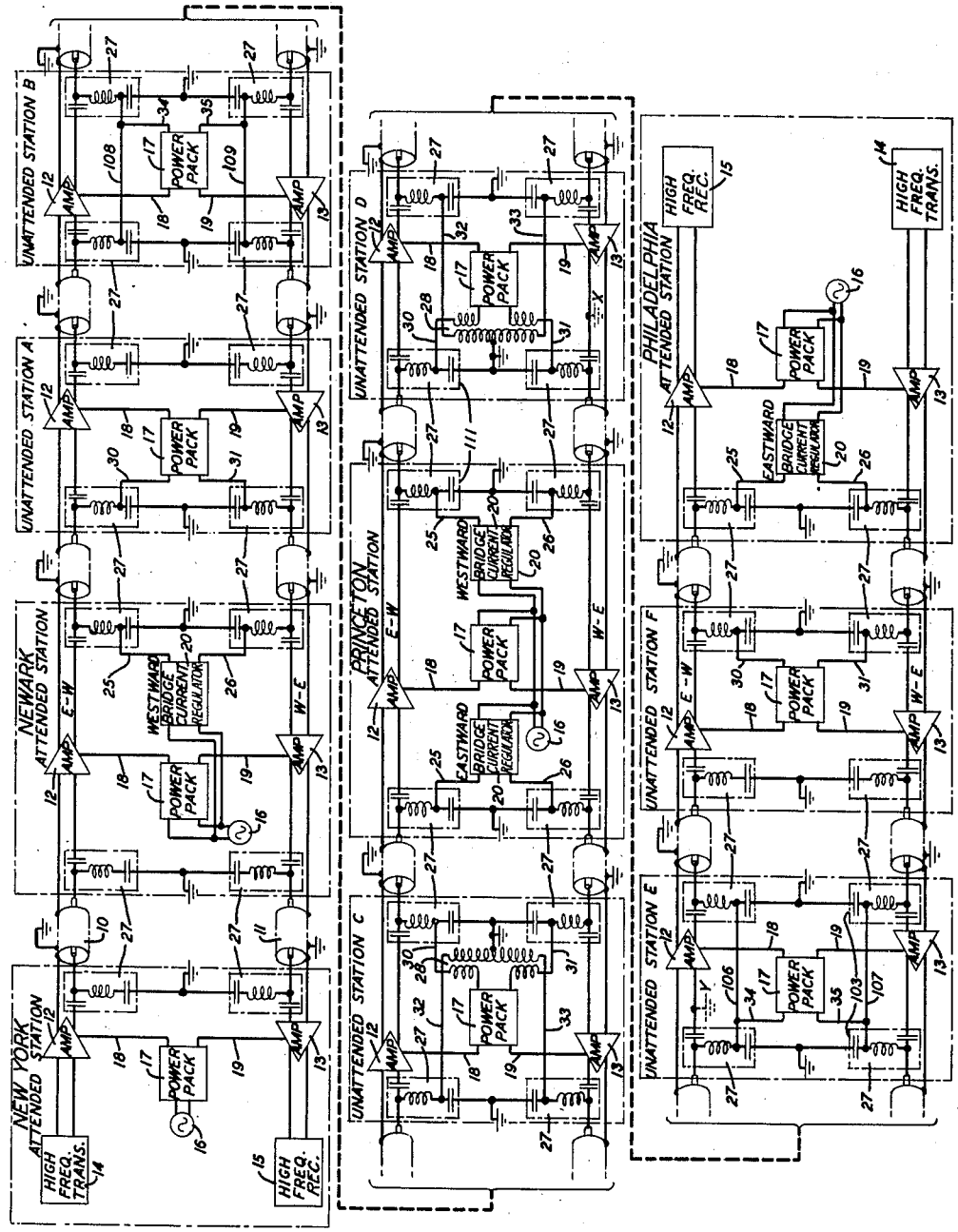
Fig. 1 is a schematic circuit diagram showing the invention in its preferred form.

In Fig. 1, New York and Philadelphia terminal attended repeater stations are shown connected by a pair of coaxial conductor lines 10 and 11. Between these terminal stations are located Newark and Princeton attended repeater stations and several unattended repeater stations. Associated with the Newark station is westward unattended station A; associated with the Princeton attended station are eastward unattended stations B and C and westward unattended stations D and E; and associated with the Philadelphia station is eastward unattended station F. Each of the stations, attended and unattended, includes a westward one-way repeater 12 and an eastward one-way repeater 13.

Also included in the New York terminal station is suitable high frequency transmitting apparatus 14 and high frequency receiving apparatus 15, preferably in the form of multiplex terminal circuits for respectively impressing on the outgoing coaxial conductor line 10 and receiving from the incoming coaxial conductor line 11 modulated carrier waves covering a large number of channels extending over a frequency range of the order of one megacycle. Identical high frequency transmitting and receiving apparatus having the same reference characters are also embodied in the Philadelphia terminal station. The multiplex transmitting and receiving apparatus may be, for example, of a type disclosed in the patent of L. Espenschied et al., No. 1,835,031, issued December 8, 1931.

Power for energizing the repeaters is derived from a commercial 60-cycle source located at each attended station. Thus, power for the New York terminal station is obtained from a source 16 connected through a power pack 17 by leads 18 and 19 to the respective repeaters 12 and 13. Similarly, power at the Newark, Princeton and Philadelphia attended stations is derived from a local 60-cycle source 16 connected through power packs 17 to the respective repeaters. At the Newark attended station the local 60-cycle power source is also connected to a westward bridge current regulator 20 whose output is applied through leads 25 and 26 and filter circuits 27, 27 to the central conductors of the coaxial conductor lines 10 and 11, respectively. At unattended station A this power is taken off the central conductors through similar filter circuits 27, 27 and leads 30 and 31, and impressed on a power pack 17 from which leads 18 and 19 supply the energizing power in proper amounts to the respective repeaters 12 and 13. In a similar manner at the Philadelphia attended station, power from the local 60-cycle source is supplied through a power pack to the repeaters thereat and is also applied to an eastward bridge current regulator for transmission over the coaxial conductor lines to supply energizing power for the repeaters located at unattended station F.

At the Princeton attended station, the local source of 60-cycle power is applied through leads 18 and 19 and power pack 17 to the repeaters located thereat and, in addition is supplied through a westward bridge current regulator 20, leads 25 and 26 and filter circuits 27, 27 to the coaxial conductor lines from which it is taken off at unattended station D through leads 30 and 31 and filter circuits 27, 27. This power is furnished through the primary windings of a multi-winding booster transformer 28 to the power pack 17 whose output is connected by leads 18 and 19 to the respective repeaters 12 and 13. The secondary winding of the booster transformer 28 is connected through leads 32 and 33, filter circuits 27, 27 at unattended station D, the central conductors of the two coaxial conductor lines, filter circuits 27, 27 at unattended station E and leads 34 and 35 to the power pack 17 at unattended station E. The output of the power pack at this station is connected by leads 18 and 19 to the respective repeaters. In a similar manner power is supplied through an eastward bridge current regulator 20 to the repeaters located at westward unattended stations C and B. The filter circuits 27, 27 connected to the central conductors at points incoming to and outgoing from all stations serve to enable power currents and high frequency currents to traverse the coaxial conductor lines without interfering with the operation of the terminal apparatus 14 and 15.

Fig. 2 shows in detail the circuit of the power pack 17 which is the same for each station and comprises a line voltage regulator 40, preferably of a saturated reactance or static type, connected to the primary of a transformer 41 having a multi-winding secondary arranged to provide the necessary voltages for energizing the repeaters 12 and 13. The power pack 17 is designed to be operated interchangeably at constant current or constant voltage, constant voltage being supplied to repeaters at attended stations and constant current being applied to repeaters at unattended stations.

Each power pack 17 is contained in a suitable housing 22, not shown, provided with switches 23, 23 (Fig. 2), that may be operated manually when the cover, not shown, of the housing 22 is removed, to short-circuit the output of line voltage regulator 40. The switches 23, 23 may also be mechanically interlocked with the cover of the housing 22 so that they are automatically closed when the cover of the housing 22 is removed. The short-circuiting of the line voltage regulator 40 prevents a workman from contacting high voltages when working on the power pack circuit.

Each power pack also includes a rectifier 36, a filter 37, a voltage divider 38 and a secondary winding 39 for supplying the proper operating voltages to the repeaters 12 and 13 over the leads shown connecting the power pack and the respective repeaters.

Fig. 3 shows in detail the westward bridge-current regulator 20 located at the Princeton attended station and it is to be understood that this apparatus is identical with the eastward current regulator located in the same station as well as the bridge current regulators located in the Newark and Philadelphia stations. The bridge current regulator also includes a line voltage regulator 40 whose output has one lead 41 directly connected to a variable tap 42 on the primary winding of a transformer 43 and another lead 44 connected through a normally open contact 45 of a relay 46 to the end of the primary of transformer 43. The function of the relay 46 will be hereinafter explained.

An end of the secondary winding of transformer 43 is connected by lead 50 to a point 51 on a Wheatstone bridge 52 formed with a capacity 53 in each of one pair of opposite arms and an inductance 54 in each of the other pair of opposite arms, both inductances being mutually related due to their disposition on the same core. An adjustable tap 55 on the secondary winding of transformer 43 is connected by a lead 56 to a point 57 on a diagonal opposite to point 51. Points 58 and 59 on the other diagonal of the Wheatstone bridge connect the output of the bridge current regulator through leads 60 and 61, windings of relays 62 and 63, leads 65 and 66 and filter circuits 27, 27 to the central conductors of the coaxial conductor lines. The output of the Wheatstone bridge is shunted by a retardation coil 64 whose function will be hereinafter explained. This capacity-inductance bridge current regulator is preferably of the type disclosed in the patents of S. F. Farkas, Nos. 2,068,316 and 2,069,316 issued January 19 and February 9, 1937, respectively.

Thus, the 60-cycle power applied to the Wheatstone bridge is converted thereby into a constant current supply that is applied through the filter circuits 27, 27 to the coaxial conductor lines. It is to be noted that the booster transformers 28 shown at unattended stations C and D are used only when the power at these stations is to be transmitted to adjacent unattended stations. For a more complete description of the transmission of power over the central conductors of two coaxial conductor lines reference may be made to the patent of M. E. Strieby, supra.

In accordance with this invention as illustrated in Fig. 3 normally closed contacts 70 and 71 associated with the respective relays 62 and 63 are each connected in series with a normally closed contact 72 of a relay 73, thereby placing a short circuit across the output of the Wheatstone bridge. The winding of relay 73 is connected across line voltage regulator output leads 74 and 75 through leads 76 and 77, normally open contact 78 of start switch 79 and lead 80. The winding of relay 81 is also connected across the line voltage regulator output leads 74 and 75 by leads 82 and 83, normally open contact 84 of start switch 79 and lead 80. Output lead 74 extends through the winding of time-delay relay 85 and lead 86 to normally closed "high voltage" contact 87 of high-low voltage relay 88 while output lead 75 extends to normally open "low voltage" contact 67 of the high-low voltage relay 88. A conductive strap 68 serves to connect the contacts 67 and 87.

The winding of high-low voltage relay 88 is connected through potentiometer 89 across secondary winding 90 associated with a transformer whose variable-tap primary 91 bridges the output of the Wheatstone bridge which supplies constant current to the central conductors of the coaxial conductor lines.

The winding of relay 46 whose normally open contact 45 interrupts the output of the line voltage regulator 40 in a manner that will be hereinafter described is also connected across line voltage regulator output leads 74 and 75 through leads 94 and 95, normally open contact 96 of relay 81 and lead 97. Transformer 98 whose primary winding bridges leads 74 and 75 has its secondary connected through the filament of lamp 99 and normally closed contact 100 of relay 81. When the output of the Wheatstone bridge is short-circuited through the contacts of relays 62, 63 and 73 as explained above and shown in Fig. 3, relay 81 is deenergized and therefore contact 100 is closed to energize the filament of lamp 99. This indicates that no power is being supplied to the coaxial conductor lines.

In operation, let it be assumed that the attendant at the Princeton station desires to energize the westward repeaters located at unattended stations D and E in Figs. 1 and 3. Assuming that the local 60-cycle source 16 in Figs. 1 and 2 is connected to the line voltage regulator 40 in Fig. 3, the attendant momentarily closes start switch 79. This completes for relay 81 an energization circuit comprising leads 74 and 82, winding of relay 81, lead 83, closed contact 84 of start switch 79, and leads 80 and 75, and for relay 73 an energization circuit comprising leads 74 and 76, winding of relay 73, closed contact 78 of start switch 79 and leads 80 and 75. The operation of relay 81 completes an energization circuit for relay 46 through leads 74 and 94, winding of relay 46, lead 95, closed contact 96 of relay 81 and leads 97 and 75. Relay 46 then operates to close its contact 45, thereby impressing the output of line regulator 40 across the primary of transformer 43.

The operation of relay 73 opens its normally closed contact 72 to remove the previously described short circuit that existed across the output of the Wheatstone bridge when no power was being applied to coaxial conductor lines. As a result, the output of the Wheatstone bridge is directly applied to the central conductors of the coaxial conductor lines through the power transmission circuit mentioned hereinbefore. As soon as the power currents traversing central conductor lines 10 and 11 attain a preselected amount, the high-low voltage relay 88 functions through its operating winding to so dispose armature 101 that contact 67 is permitted to close. By means of potentiometer 89 and variable-tap secondary winding 90, the preselected limits within which high-low voltage relay 88 is rendered effective may be adjusted to suit particular operating conditions. Voltmeter 93 coupled through secondary winding 92 to primary winding 91 bridged across the output of the Wheatstone bridge is provided for ascertaining the proper operating voltages for the Wheatstone bridge.

The closing of contact 67 completes an energization circuit for time-delay relay 85 through lead 74, winding of relay 85, lead 86, closed contact 87 of high-low voltage relay 88, strap 68, closed contact 67 of high-low voltage relay 88 and lead 75. Time-delay relay 85 operates to provide for relay 81 a lock-up path comprising leads 74 and 82, winding of relay 81, closed contact 110, lead 102, closed contact 103 of time-delay relay 85 and leads 104 and 75. This lock-up path serves to hold relay 46 in an operated condition to apply the line voltage regulator 40 to the transformer 43. The time delay of relay 85 is so predetermined that it does not operate or deenergize for a certain interval after the functioning of the high-low voltage relay 88. Thus, the time delay is fixed to distinguish the faults described hereinafter on the basis of momentary or permanent duration.

As the output of Wheatstone bridge 52 traverses the coaxial conductor lines extending between unattended stations D and E and the power packs located thereat, energization circuits for relays 62 and 63 loop through stations D and E, and these relays are operated. Consequently, contacts 70 and 71, respectively, are opened to interrupt the short circuit across the output of the Wheatstone bridge that was previously described in connection with relay 73. Upon the release of start key 79, relay 73 is deenergized and its contact 72 returns to its normally closed position. This, however, does not affect the removal of the short circuit across the output of Wheatstone bridge which, as mentioned hereinbefore, is now interrupted through open contacts 70 and 71 associated with the respective relays 62 and 63. Relay 81 remains operated, however, through its hereinbefore-mentioned locking path.

The inadvertent occurrence of a fault comprising a ground at any point along the power transmission circuit extending between Princeton westward bridge current regulator 26 and the power packs located in unattended stations D and E, say, for example, at either point X or point Y, or the occurrence of a fault comprising an interruption in the leads extending between these power packs and their associated repeaters causes a predetermined variation in the power voltage being transmitted. This voltage variation serves to actuate the armature 101 of the high-low voltage relay 88 to open either contact 67 or 87 depending on whether the variation is an increase or decrease. If a ground, or short circuit, occurs, the voltage supplied by the bridge current regulator decreases, and therefore the armature 101 of the high-low voltage relay 88 will drop to open contact 67; if, however, an open circuit occurs the voltage increases, and hence armature 101 will rise to open contact 87. After a predetermined interval, time-delay relay 85 operates to interrupt the locking circuit of relay 81 which now deenergizes to cause a deenergization of relay 46. This opens contact 45 to disconnect the line voltage regulator 40 from transformer 43. The cutting off of this power supply will also cause the deenergization of relays 62 and 63 to establish the hereinbefore-mentioned short circuit across the output of the Wheatstone bridge.

In the event of a sharp increase in the power voltage across coaxial conductor lines due to an open circuit, the retardation coil 64 shunted across the output of the bridge regulator 52 serves as the load. Consequently, this coil prevents an abnormal increase in the power voltage during the interval required for the operation of time-delay relay 85 to disconnect the source 16 of 60-cycle power from the Wheatstone bridge. During a normal operation of the bridge current regulator, the retardation coil 64 shunts relatively little power current, and accordingly does not seriously impair the efficiency of power transmission.

After relay 81 returns to an unoperated condition the filament of lamp 99 at Princeton attended station is energized to indicate a fault in the power circuit extending between this station and either unattended station D or E. It is understood that the lamp 99 may comprise any suitable alarm apparatus, either visual or audible, or a combination of both.

So long as the power transmission circuit embodies one of the inadvertent faults mentioned above, it will be impossible for the attendant at the Princeton station to permanently apply the commercial power supply to the faulty section of the coaxial conductor lines. This is so for the reason that an open contact in high-low voltage relay 88 will prevent time-delay relay 85 from operating to complete the locking circuit for relay 81.

Consequently, it will be necessary for a workman to proceed to both unattended stations D and E and there test for the character and location of the fault. Inasmuch as the central conductor of each coaxial conductor line is available for test purposes at each filter circuit 27 which is enclosed in a suitable housing 111, access to the central conductor can therefore be had only by removing the cover, not shown, of the housing 111. As soon as the cover is removed the central conductor is grounded at 105 (Fig. 3) through a switch 104 that may be manually operated, or automatically actuated due to a mechanical interlocking, not shown, with the cover of the housing 111. So long as a workman is testing the central conductor at an attended or unattended station, the grounding at 105 of the filter circuit 27 protects him from contacting any high voltage. It is, of course, understood that the filter circuit 27 shown in Fig. 3 is identical with the filter circuits associated with the other attended and unattended stations. The ground 105 is, of course, removed manually or by closing the door associated with the particular housing 111 opened for test purposes.

The short circuiting of the output of the Wheatstone bridge through the contacts of relays 62, 63 and 73 after the grounding of the central conductors serves to discharge the constant-current power transmission circuit. Thus any electrostatic charge remaining on this circuit after the disconnection of the commercial 60-cycle power supply is removed. The possibility of injury to the workman from this source is therefore obviated. The contacts of relays 62 and 63 are both connected in parallel with the contact of relay 73 to provide additional safety protection for a workman. Consequently, a failure of either relay 62 or 63 still enables a completion of the short circuit through the contact of the operative relay.

It is understood that the eastward bridge current regulator at Princeton together with those located at Newark and Philadelphia stations functions with respect to the unattended stations associated therewith in a manner that is identical with the hereinbefore-described operation of westward bridge current regulator relative to unattended stations D and E.

Referring to unattended station E shown in Fig. 1, it is seen that leads 106 and 107 connect the filter circuits 27, 27 disposed on both sides of each of the repeaters 12 and 13. While there is no power current transmitted over leads 106 and 107 between unattended stations E and F, these leads serve the purpose of associating the stations from a safety standpoint in the manner afore described in connection with unattended stations D and E in the event of an inadvertent fault occurring on the section of coaxial conductor line extending between unattended stations E and F. In a similar manner leads 108 and 109 in unattended station B are utilized to associate unattended stations A and B from a safety standpoint when an inadvertent fault occurs on the section of coaxial conductor line extending between these stations.

What is claimed is:

1. In a signal transmission system having geographically spaced repeater stations and a transmission line extending therebetween, means at one repeater station to apply a substantially constant-current power to said transmission line for operating one or more of said spaced repeater stations comprising a power source at said one station, a current regulator for said source, means for connecting said source to said regulator, means responsive to increases and decreases in the voltage of the power applied to said transmission line to actuate said connecting means to disconnect said source from said regulator, and means responsive to such disconnection to render said regulator inert.

2. In a high-frequency carrier wave system comprising attended stations and unattended stations, two coaxial conductor lines connecting said stations, means to transmit high-frequency carrier waves between said stations over one of said lines in one direction and over the other of said lines in an opposite direction, a one-way repeater in each of said lines in each of said stations, a power transmission circuit comprising portions of the central conductors of each of said coaxial conductor lines in a series circuit extending from an attended station through at least one unattended station, a bridge current regulator for applying constant-current power to said transmission circuit, a source for supplying commercial power to said bridge current regulator circuit, a local circuit at each of said unattended stations to derive power from said power transmission circuit for energizing said repeaters thereat, means for disconnecting said commercial power supply from said bridge current regulator when an inadvertent fault occurs in said power transmission circuit comprising means for connecting said commercial power source to said bridge current regulator, and means responsive to increases and decreases in the voltage of the constant-current power applied to said power transmission circuit for controlling said connecting means, and means responsive to such disconnection to render said bridge current regulator inert.

3. In a high-frequency carrier wave system comprising attended stations and unattended stations, two coaxial conductor lines connecting said stations, means to transmit high-frequency carrier waves between said stations over one of said lines in one direction and over the other of said lines in an opposite direction, a one-way repeater in each of said lines in each of said stations, a power transmission circuit comprising portions of the central conductors of each of said coaxial conductor lines in a series circuit extending from an attended station through at least one unattended station, a bridge current regulator for applying constant-current power to said transmission circuit, a source for supplying commercial power to said bridge current regulator circuit, a local circuit at each of said unattended stations to derive power from said power transmission circuit for energizing said repeaters thereat, means for disconnecting said commercial power source from said bridge current regulator when an inadvertent fault occurs in said power transmission circuit comprising means for connecting said commercial power source to said bridge current regulator, means for establishing a short circuit across the output of said bridge current regulator when no constant-current power is being impressed on said power transmission circuit, means for controlling said connecting means, means for interrupting said short circuit when said controlling means is actuated to connect said commercial power source to said bridge current regulator, and means responsive to predetermined variations in the voltage of the constant-current power applied to said power transmission circuit for actuating said connecting means to disconnect said commercial power source from said bridge current regulator, said short circuit being re-established when said commercial power source is disconnected.

4. In a high-frequency wave system comprising attended stations and unattended stations, two coaxial conductor lines connecting said stations, means to transmit high-frequency carrier waves between said stations over one of said lines in one direction and over the other of said lines in an opposite direction, a one-way repeater in each of said lines in each of said stations, a power transmission circuit comprising portions of the central conductors of each of said coaxial conductor lines in a series circuit extending from an attended station through at least one unattended station, a bridge current regulator for applying constant-current power to said transmission circuit, a source for supplying commercial power to said bridge current regulator circuit, and a local circuit at each of said unattended stations to derive power from said power transmission circuit for energizing said repeaters thereat, means for disconnecting said commercial power source from said bridge current regulator in response to predetermined variations in the voltage of the constant-current power supplied to said power transmission circuit comprising a high-low voltage relay, high voltage and low voltage contacts associated with said high-low voltage relay, a transformer coupling the winding of said high-low voltage relay to the output of said bridge current regulator, a time-delay relay whose winding connects said high voltage and low voltage contacts to said commercial power source, a contact associated with said time-delay relay and connected to said commercial power supply, a start switch, a start relay whose winding is connected to said commercial power supply through said start switch, a plurality of contacts associated with said start relay, a control relay whose winding is connected to said commercial power source through one of said contacts of said start relay, a lead connecting said contact of said time-delay relay and another of said contacts of said start relay, relay means connected to the output of said bridge current regulator, start switch and commercial power supply, said relay means being controlled by said high-low voltage regulator and said start switch for short circuiting the output of said bridge current regulator, indicating means, and a transformer having its primary winding bridged across said commercial power supply and its secondary winding connected to said indicating means and another of said contacts of said start relay.

5. In a signal transmission system having geographically spaced repeater stations, means at one repeater station to apply a substantially constant-current power to said transmission system for operating repeaters in stations spaced from said one repeater station comprising a power source at said one station, a current regulator for said source, means for connecting said source to said regulator, means including a high-low voltage relay operated by increases and decreases in the voltage of the power applied to said transmission system for actuating said connecting means to disconnect said source from said regulator, and means responsive to such disconnection to short-circuit the output of said regulator.

6. The signal transmission system according to claim 5 in which the last-mentioned means also includes a time-delay relay for distinguishing between momentary and permanent operations of said high-low voltage relay.

7. In a signal transmission system having geographically spaced repeater stations, means at one repeater station to apply a substantially constant-current power to said transmission system for operating repeaters in stations spaced from said one station comprising a power source at said one station, a current regulator for said source, means for connecting said source to said regulator, means operable in response to increases and decreases in the voltage applied to said transmission system for actuating the connecting means thereby indicating the existence of faults in the power supply for the repeaters in the stations spaced from said one repeater station, and means responsive to fault-indicating actuations of the connecting means to short-circuit the output of said regulator.

8. In a high-frequency carrier wave system comprising attended and unattended stations, two coaxial conductor lines connecting said stations, means to transmit high-frequency carrier waves between said stations over one of said lines in one direction and over the other of said lines in an opposite direction, a one-way repeater in each of said lines at each of said stations, a power transmission circuit comprising portions of the central conductors of each of said coaxial conductor lines extending in a series circuit from an attended station through at least one unattended station, a local circuit in each unattended station to derive power from said transmission circuit for operating the repeaters thereat, a bridge current regulator for applying constant-current power to said transmission circuit, a source for supplying commercial power to said bridge current regulator circuit, means for connecting said commercial power source to said bridge current regulator, means including a high-low voltage relay operated by increases and decreases in the voltage of the power applied to said transmission circuit for controlling said connecting means, and means responsive to the controlling of the connecting means for rendering said bridge current regulator effective and ineffective.

9. In a high-frequency carrier wave system comprising attended and unattended stations, two coaxial conductor lines connecting said stations, means to transmit high-frequency carrier waves between said stations over one of said lines in one direction and over the other of said lines in an opposite direction, a one-way repeater in each of said lines in each of said stations, a power transmission circuit comprising portions of the central conductors of each of said coaxial conductor lines extending in a series circuit from an attended station through at least one unattended station, a local circuit in each unattended station to derive power from said transmission circuit for operating the repeaters thereat, a bridge current regulator for applying a constant-current power to said transmission circuit, a source for supplying commercial power to said bridge current regulator circuit, means for connecting said commercial power source to said bridge current regulator, means operable in response to increases and decreases in the voltage applied to said power transmission circuit for actuating the connecting means thereby indicating in the attended station the existence of faults in said circuits supplying power for the repeaters in the unattended stations, and means responsive to fault-indicating actuations of said connecting means to render said regulator inert.

ROBERT P. JUTSON.
JOEL L. LAREW.